April 3, 1962 J. E. RAIDEL 3,028,176
AUTOMATIC TRAILER SUPPORT ASSEMBLY
WITH SWINGABLE LOWER SECTION
Filed Nov. 28, 1960 3 Sheets-Sheet 1
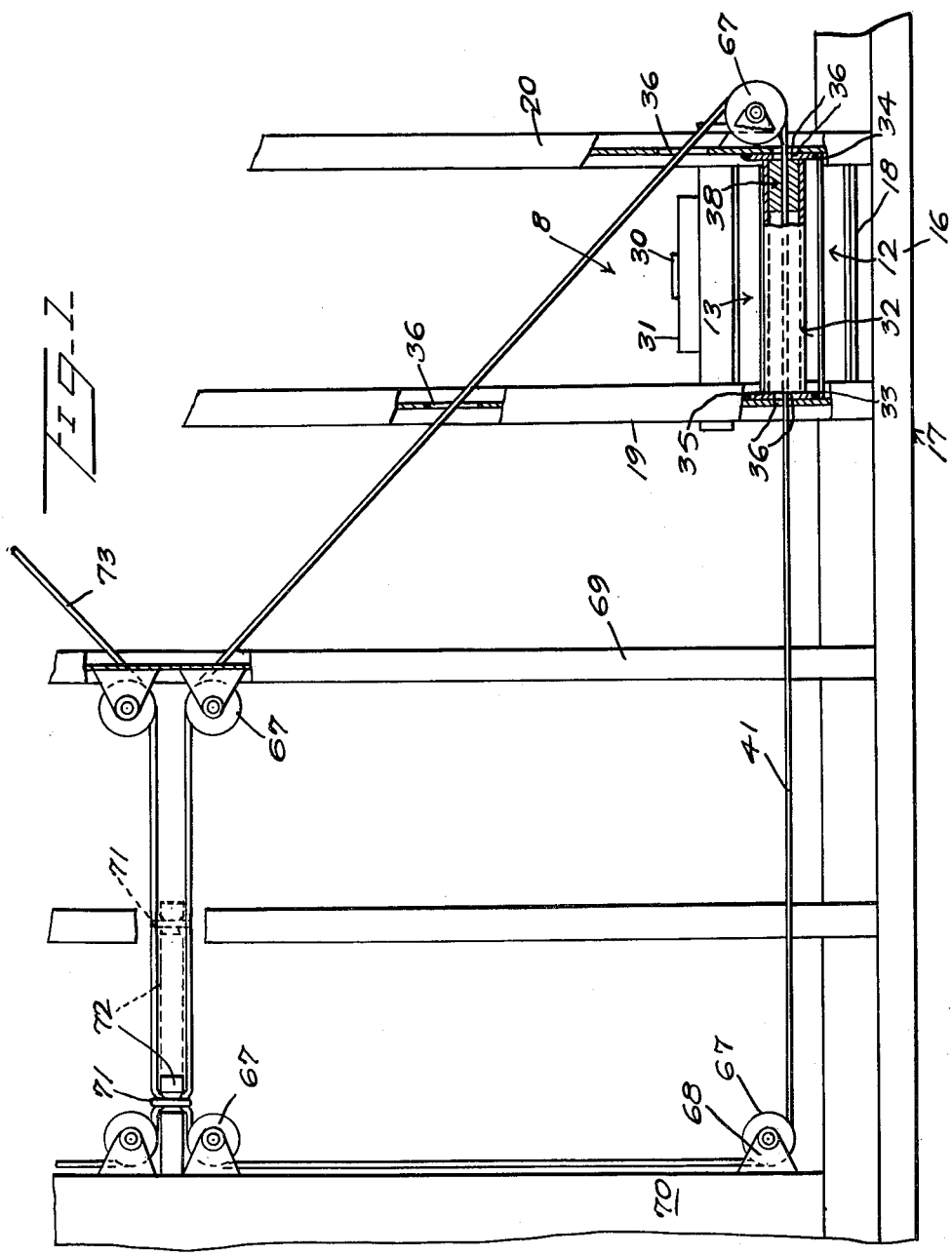
INVENTOR
JOHN E. RAIDEL
BY John N. Randolph
ATTORNEY

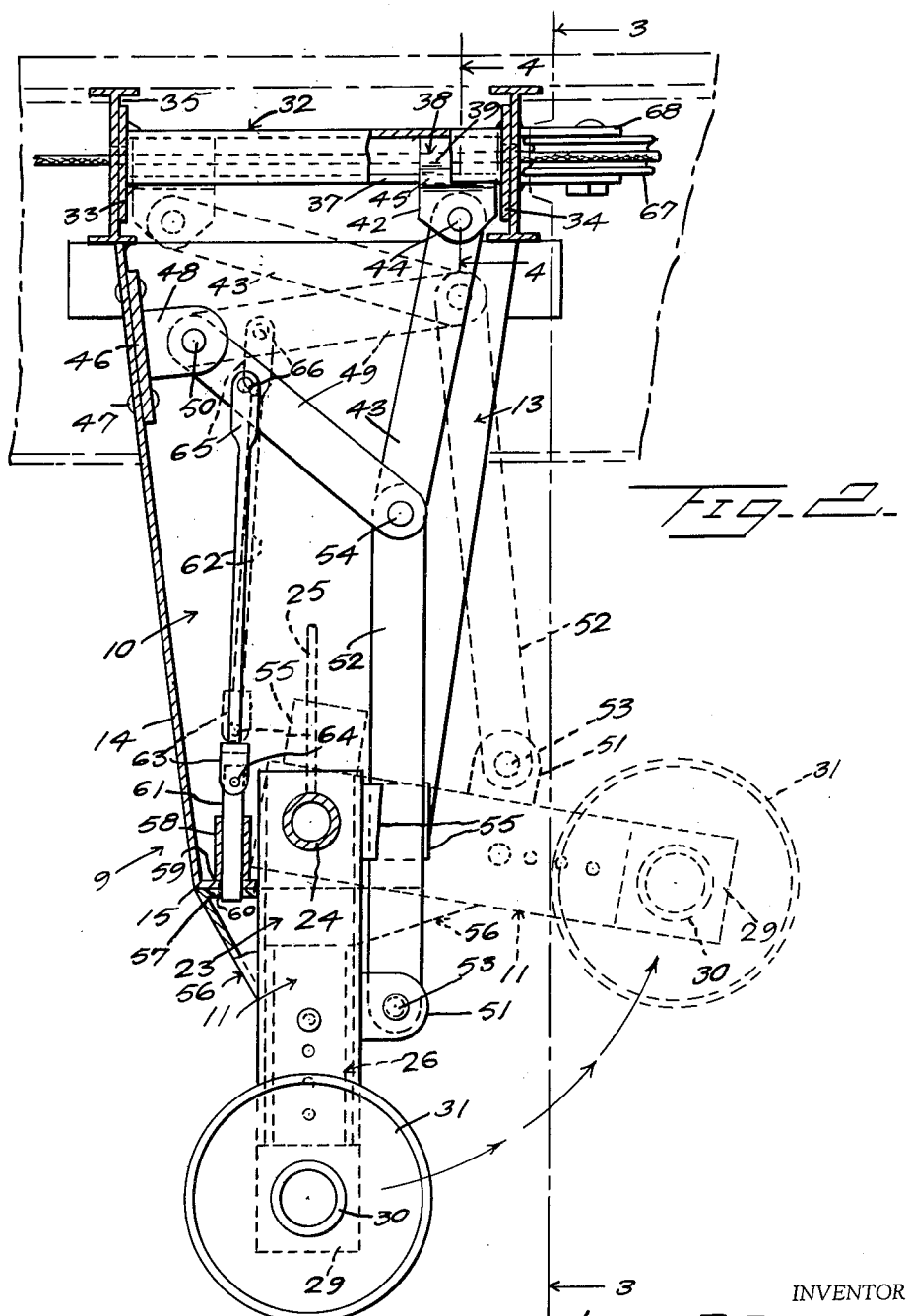

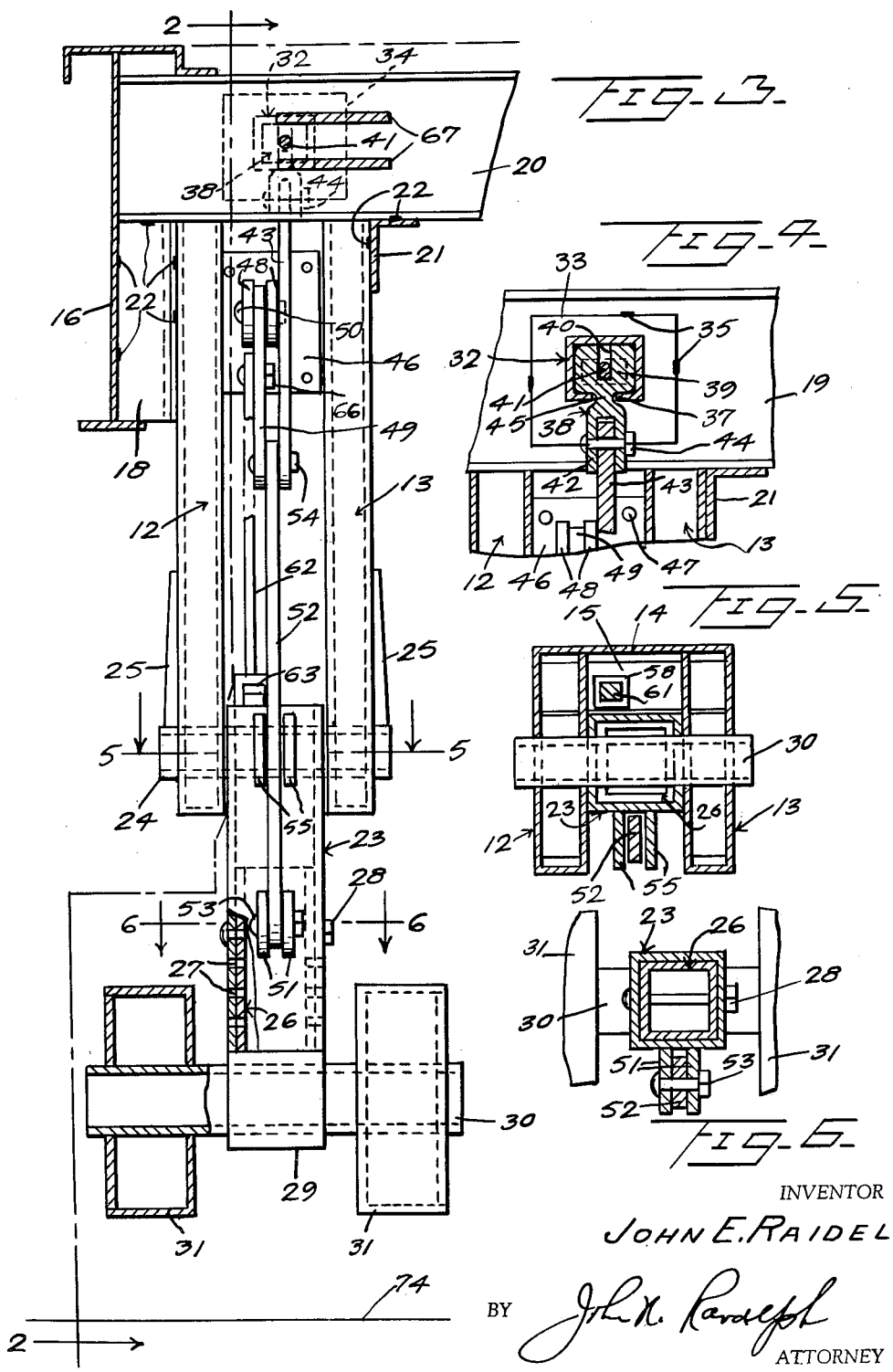

United States Patent Office 3,028,176
Patented Apr. 3, 1962

3,028,176
AUTOMATIC TRAILER SUPPORT ASSEMBLY WITH SWINGABLE LOWER SECTION
John E. Raidel, 15002 Dunton Drive, Whittier, Calif.
Filed Nov. 28, 1960, Ser. No. 72,217
9 Claims. (Cl. 280—150.5)

This invention relates to a front trailer support assembly having ground engaging wheels for supporting or partially supporting the forward end of a trailer while detached from its tractor.

Another object of the invention is to provide a trailer support assembly adapted to be coupled to and actuated by a part of the coupler of the trailer for automatically moving the support assembly to a lowered operative position as the trailer is uncoupled from its tractor, and for automatically returning the support assembly to an inoperative position as the trailer is coupled to a tractor.

Still another object of the invention is to provide a support assembly which may be readily attached to existing trailers without requiring any extensive modification of the existing trailer structure and which can be adjusted as to length to accommodate the support assembly to trailer chassis disposed different distances above the ground.

Various other objects and advantages of the invention will hereinafter become more fully apparent from the following description of the drawings, illustrating a presently preferred embodiment thereof, and wherein:

FIGURE 1 is a fragmentary top plan view of the forward portion of a trailer chassis showing the support assembly applied thereto, certain of the parts being shown broken away and in section;

FIGURE 2 is an enlarged vertical sectional view, partly in side elevation, of the support assembly;

FIGURE 3 is a fragmentary vertical sectional view taken substantially along the line 3—3 of FIGURE 2;

FIGURE 4 is an enlarged fragmentary transverse sectional view taken substantially along a plane as indicated by the line 4—4 of FIGURE 2;

FIGURE 5 is a horizontal sectional view taken substantially along a plane as indicated by the line 5—5 of FIGURE 3, and FIGURE 6 is a fragmentary horizontal sectional view taken substantially along a plane as indicated by the line 6—6 of FIGURE 3.

Referring more specifically to the drawings, the automatic trailer support assembly in its entirety is designated generally 8 and includes a supporting leg, designated generally 9, having an upper section, designated generally 10, and a lower section, designated generally 11. The upper section 10 includes two transversely spaced longitudinally elongated side members 12 and 13 of hollow or box shape cross section, as seen in FIGURE 5, which taper in width from upper to lower ends thereof, and which are connected to one another by an integral front wall 14 and by a partial bottom wall 15 constituting an inturned flange of an intermediate portion of the bottom edge of the wall 14 and which extends only a short distance rearwardly from said front wall 14, as seen in FIGURE 2.

The upper portion of the box-like side member 12 is connected to a side frame member 16 of a trailer chassis 17 by a connecting bracket 18, which bracket is also connected to the undersides of two crossbeams 19 and 20 of the chassis 17. The other inner side member 13 is connected to the undersides of the cross members 19 and 20 by an angle bracket 21. The brackets 18 and 21 may be connected to the parts 16, 19, 20 and 12, and 19, 20 and 13, respectively, in any suitable manner, as by means of welding, as indicated at 22 in FIGURE 3. Thus, the upper leg section 10 depends from the undersides of the cross members 19 and 20 and the inner side of the side frame member 16 and with the side members 12 and 13 disposed in planes parallel to the longitudinal axis of the chassis 17.

The lower leg section 11 includes an upper post 23 of hollow rectangular cross section having an upper end which fits loosely between lower portions of the side members 12 and 13, and which is swingably connected thereto by a pin 24 which extends loosely through the upper part of the post 23 and through lower portions of the side members 12 and 13. Web members 25 may be secured to the exposed ends of the pin 24 and to outer sides of the members 12 and 13. The pin 24 swingably mounts the post 23 and thus swingably connects the lower leg section 11 to the upper leg section 10 for vertical swinging movement in a plane parallel to the longitudinal axis of the chassis 17 from a depending vertical position, as seen in full lines in FIGURE 2, upwardly and rearwardly to a dotted line position as shown in this view. The lower leg section 11 includes a lower post 26 which fits slidably and nonrotatably in the post 23. The lower portion of the post 23 and the upper portion of the post 26 have spaced openings 27, as seen in FIGURE 3, which may be selectively arranged in alignment to receive a nut and bolt fastening 28 for connecting the posts 23 and 26 together and with the post 26 in different extended positions relative to the lower end of the post 23. Thus, the over-all length of the leg 9 may be varied to accommodate the assembly 8 to tractor chassis disposed at different elevations. The lower post 26 has an enlargement 29 at its lower end, disposed below the post 23, through which extends an axle 30 having wheels 31 mounted thereon and which straddle lower portions of the posts 23 and 26. The axle may be journaled in the enlargement 29 and have the wheels 31 fixed thereto, or said axle may be fixed to the enlargement and have the wheels journaled thereon.

An elongated hollow guide member or rail 32 is provided with end plates 33 and 34 and is disposed between the cross members 19 and 20 and with the end plates secured thereto, as by welding, as indicated at 35. The plates 33 and 34 and the cross members 19 and 20 have aligned openings 36 which align with the interior of the rail 32, and said rail has a downwardly opening slot 37 extending from end-to-end thereof, as best seen in FIGURE 4.

A cable actuated slide 38 has an upper head portion 39 which fits slidably in the guide or rail 32 and which has an upwardly opening slot 40 extending from end-to-end thereof in which a portion of a cable 41 or other elongated element is received and clamped. The element 41 extends longitudinally through the rail 32 and through the openings 36, as seen in FIGURE 1, and it will be understood that the slide 38 will move with the element 41 and with the head 39 thereof traveling in the rail 32. The slide 38 has a lower bifurcated portion 42 which is disposed below the rail 32 and in which the upper end of a rigid link 43 is pivotally mounted by a fastening 44. The slide 38 has a restricted neck portion 45, located between the head 39 and bifurcated portion 42, and which fits loosely in the slot 37.

A bracket 46 is secured to the upper portion of the inner or rear side of the front wall 14 in any suitable manner as by fastenings 47 and has a pair of rearwardly projecting ears 48 between which an end of a rigid link 49 is pivotally mounted by a fastening 50. A pair of laterally spaced ears 51 are fixed to and project rearwardly from the post 23 to receive the lower end of a rigid link 52 which is pivotally connected thereto by a fastening 53. The upper end of the link 52 is pivotally connected by a fastening 54 to the rear end of the link 49 and the lower end of the link 43. The upper portion of the post 23 has rearwardly extending laterally spaced ear members 55 forming a guide between which a part of the link 52 loosely fits when the leg section 11 is in an extended position.

The post 23 is provided on its forward side with an abutment 56 having a top wall 57 which abuts against the underside of the bottom wall 15 when the post 23 is in a depending vertical position, behind said wall 15.

A guide sleeve 58 is fixed to and rises from the bottom 15 and is disposed in alignment with an opening 59 of said bottom. An opening 60 in the wall 57 aligns with the opening 59 when said wall 57 is in abutting engagement with the bottom 15. A pin 61 slidably engages the guide sleeve 58. A pull rod 62 has a clevis 63 at its lower end which is pivotally connected by a pin 64 to the upper end of the pin 61 and a clevis 65 at its upper end which is pivotally connected by a pin 66 to the link 49, between the pivots 50 and 54, and nearer the pivot 50.

As illustrated in FIGURE 1, the element 41 to which the slide 38 is secured is preferably a part of an endless cable which is trained over pulleys 67 mounted on brackets 68 which are secured to the cross member 20 and cross members 69 and 70 of the frame or chassis 17. The cable 41 extends through other openings 36 of the cross members of the chassis 17. A part of the cable 41 is secured by a clamping ring 71 to a rod 72 which is disposed for sliding movement lengthwise of the chassis 17 and which is adapted to be connected to a longitudinally movable part of a trailer coupler, such as the trailer coupler disclosed in my co-pending application filed October 5, 1960, Serial No. 60,736. The member 72 corresponds to the element 99 of said application. A part of a second endless cable 73 is shown in FIGURE 1 and which can be connected, in the same manner as the cable 41, to another support assembly, not shown, located adjacent the other side edge of the trailer chassis and in transverse alignment with the support assembly 8. However, a single support assembly could be utilized and could be located midway of the sides of the trailer chassis 17 rather than adjacent the side 16. Further, the support assembly 8, as shown in FIGURES 2 to 6, can be actuated by other elements than the endless cable 41, including any elongated element having a portion movable longitudinally of the trailer chassis and through the rail 32.

In the position of the support assembly 8 as shown in FIGURES 1 and 3 and in full lines in FIGURE 2, the leg 9 is shown with its lower section extended downwardly and as it will appear as a tractor, not shown, is being coupled to the forward end of the trailer or uncoupled therefrom and while the forward end of the trailer is supported on the tractor fifth wheel. Assuming that the trailer is being uncoupled, there will be no further movement of the parts from the positions as seen in FIGURES 1 and 3 and in full lines in FIGURE 2 and as the tractor disengages the trailer, the forward end of the trailer will drop downwardly a few inches until the wheels 31 come to rest on the surface 74 for supporting or partially supporting the forward end of the trailer. In this position of the parts, as best seen in FIGURE 2, the latch pin 61 engages the openings 59 and 60 for latching the lower leg section 11 in its depending vertical position. When thus disposed, the slide 38 is at the rear end of the rail 32 adjacent the plate 34, the link 49 is inclined downwardly and rearwardly from its pivot 49 to the pivot 54 and the pivot 54 is disposed forwardly of a straight line intersecting the pivots 44 and 53, so that the links 49, 43 and 52, in their full line positions, form a toggle linkage which will resist upward and rearward swinging movement of the leg section 11, due to the pivot 54 being disposed forwardly of the pivot 44 and directly above the pivot 53.

As the trailer is coupled to a tractor, not shown, as described in my aforementioned application, the forward end of the trailer is initially elevated slightly by the tractor fifth wheel engaging and moving under the forward end of the trailer. As this occurs, the forward end of the trailer is elevated slightly so that the wheels 31 are raised to their positions of FIGURES 2 and 3 relative to the surface 74. Thereafter, the member 72 commences its rearward travel from right to left of FIGURE 1, from its full line to its dotted line position causing a part of the element 41 connected thereto to move in the same direction or rearwardly, and a part of the element 41, which extends through the rail 32, to move in the opposite direction, forwardly or from right to left of FIGURE 2.

The head 39 has a sufficiently loose fitting engagement in the rail 32 so that the slide 38 can move the upper end of the link 43 and the pivot 44 from right to left from its full line position of FIGURE 2 across a straight extension of the axis of the link 52. Thereafter, as the slide 38 moves with the part of the element 41 to which it is secured toward the forward end plate 33, it will exert an upward pull on the pivot 54 to swing the links 49 and 52 toward their dotted line positions and as the slide 38 and link 43 move forwardly and toward their dotted line positions. A slight upward movement of the link 49 will lift the pin 61 sufficiently so that it will disengage the forward part of the opening 60, which is slightly enlarged as seen in FIGURE 2, to thus unlock the abutment 56 from the wall 15 to permit the lower leg section 11 to commence to swing upwardly in a counterclockwise direction from its full line toward its dotted line position of FIGURE 2. When the member 72 has reached its complete rearward travel to its dotted line position of FIGURE 1, the slide 38 will have completed its forward travel to its dotted line position of FIGURE 2, and the leg section 11 will be in its fully raised dotted line position. During such movement, parts of the links 43, 49 and 52 swing through the open rear side of the upper leg section 10, between the side members 12 and 13.

The aforedescribed operation is reversed as the trailer is uncoupled. When this occurs, before the trailer disengages the tractor fifth wheel, the member 72 will move forwardly or from right to left of FIGURE 1 from its dotted line to its full line position, causing rearward movement, from left to right, of the slide 38 and a part of the element 41 connected thereto. As the slide 38 moves rearwardly or from right to left of FIGURE 2 from its dotted line position, rearward movement of the link 43 will force the link 49 to swing downwardly, thereby forcing the link 52 downwardly for swinging the lower leg section 11 downwardly and forwardly in a clockwise direction until the parts resume their full line positions. As the parts approach their full line positions of FIGURE 2 and as the top abutment wall 57 moves into engagement with the bottom 15, the latch pin 61 is projected through the opening 60 to latch the leg section 11 in its extended position, after which the pivot 44 travels with the slide 38 rearwardly across an extension of a straight line passing through the pivots 53 and 54 for locking the toggle-like linkage in its full line position.

Various modifications and changes are contemplated and may be resorted to, without departing from the function or scope of the invention as hereinafter defined by the appended claims.

I claim as my invention:

1. An automatic trailer support assembly comprising a leg including a rigid upper leg section adapted to be fixed to and depending from a forward part of a trailer chassis, said leg including a lower section having an upper end and a lower end, a pivot element swingably connecting the upper end of the lower section to a lower portion of said upper section for swinging movement of the lower section relative to the upper section in a vertical plane, a slide, means adapted to be secured to the trailer and supporting said slide for sliding movement above said leg and in directions crosswise of the axis of said pivot element, an actuator element connected to said slide and operable for moving said slide in opposite directions in said means, a first link having an end pivotally connectde to said slide, a second link having an end pivotally connected to said lower leg section, a third link having an end pivotally connected to said upper leg section below the slide and above said lower leg section, and a pivot member connecting the other ends of said first, second and third links together and forming a knee joint whereby when the slide is moved in one direction, toward the pivoted mounted end of said third link, an upward pull is exerted on the knee joint for swinging said third link upwardly to elevate the second link for swinging said lower leg section upwardly to a raised position as the slide moves to a position substantially above said pivotally mounted end of the third link, said first link exerting a pushing force on said knee joint as the slide is moved in the opposite direction away from a position above the pivoted end of said third link for forcing the knee joint to swing downwardly with the third link and to exert a downward force against said second link for swinging said lower leg section downwardly to a depending operative position relative to the upper leg section.

2. An automatic trailer support assembly as in claim 1, a ground engaging wheel supported by a lower end of said lower leg section for rotation about an axis disposed parallel to the axis of said pivoted element.

3. An automatic trailer support assembly as in claim 1, said lower leg section being formed of adjustably connected extensible sections for varying the over-all length of said leg.

4. An automatic trailer support assembly as in claim 1, the travel of said slide in said means being such as to cause the pivot connecting the slide to said first link to pass across the axis of said second link, after the second link is displaced downwardly by movement of the slide in said last mentioned direction, for locking the linkage system so that movement of the slide in the opposite direction cannot be effected by a force exerted on the knee joint in a direction toward the slide.

5. An automatic trailer support assembly as in claim 1, a latch pin slidably mounted in a part of said upper leg section and slidably engaging in a part of said lower leg section, when the lower leg section is in an extended operative position, and means connecting said pin to said third link for extracting the pin from said part of the lower leg section to unlatch the leg sections from one another as the slide is moved in said first mentioned direction for swinging the lower leg section upwardly to an inoperative position.

6. An automatic trailer support assembly as in claim 1, said actuator comprising a part of an endless cable, a cable actuating member adapted to be mounted for sliding movement lengthwise of the trailer and connected to another part of said cable for moving the cable in opposite directions and for causing movement of the slide in a direction opposite to the direction of movement of said cable actuating member.

7. An automatic trailer support assembly comprising a leg including a rigid upper leg section adapted to be fixed to and depending from a forward part of a trailer chassis, said leg including a lower section having an upper end and a lower end, a pivot element swingably connecting the upper end of the lower section to a lower portion of said upper section for swinging movement of the lower section relative to the upper section in a vertical plane, a slide, means adapted to be secured to the trailer and supporting said slide for sliding movement above said leg and in directions crosswise of the axis of said pivot element, an actuator element connected to said slide and operable for moving said slide in opposite directions in said means, said means limiting travel of the slide, and a linkage system pivotally connected to the slide, to said lower leg section below the pivot element, and to the upper leg section above said pivot element, for causing the lower leg section to swing between a depending position in alignment with the upper leg section and a raised position at an angle to the upper leg section as the slide is moved from end-to-end of said means.

8. An automatic trailer support assembly as in claim 7, said linkage system comprising three interconnected links.

9. An automatic trailer support assembly as in claim 7, said linkage system including a first link connected to the slide, a second link connected to the lower leg section, a third link connected to the upper leg section, and an element pivotally connecting the links to one another.

References Cited in the file of this patent

UNITED STATES PATENTS

| | | |
|---|---|---|
| 1,998,001 | Edwards | Apr. 16, 1935 |
| 2,020,161 | Robb | Nov. 5, 1935 |
| 2,066,430 | Swift | Jan. 5, 1937 |